(12) United States Patent
Hunter

(10) Patent No.: US 6,597,557 B2
(45) Date of Patent: Jul. 22, 2003

(54) POWER ADAPTER

(76) Inventor: Charles P. Hunter, 1108 Chipping Ct., Virginia Beach, VA (US) 23455

( * ) Notice: Subject to any disclaimer, the term of this patent is extended or adjusted under 35 U.S.C. 154(b) by 0 days.

(21) Appl. No.: 10/131,500

(22) Filed: Apr. 25, 2002

(65) Prior Publication Data

US 2003/0058601 A1 Mar. 27, 2003

Related U.S. Application Data

(63) Continuation of application No. PCT/US00/41543, filed on Oct. 25, 2000.
(60) Provisional application No. 60/161,077, filed on Oct. 25, 1999.

(51) Int. Cl.$^7$ .............................................. H01C 7/12
(52) U.S. Cl. ........................................ 361/118; 341/441
(58) Field of Search ................................ 361/118, 111; 439/501; 363/146; 341/441

(56) References Cited

U.S. PATENT DOCUMENTS 5,629,826 A * 5/1997 Roca et al. ................. 361/118
5,923,146 A * 7/1999 Martensson ................. 320/111

* cited by examiner

*Primary Examiner*—Shawn Riley
(74) *Attorney, Agent, or Firm*—Burns, Doane, Swecker & Mathis, LLP

(57) ABSTRACT

A power adapter for an electrical device includes a male electrical plug, an electrical connection, electrical circuitry connected to the plug for converting power input to the power adapter through the plug to power suitable for an electrical device to be electrically connected to the electrical connection. The power adapter further includes a housing member for containing the plug, the electrical connection, and the electrical circuitry and including a cord including an electrical power cord attached at a first end to the electrical connection and attachable at a second end to the electrical device, and a reel on which the cord is adapted to be wound and from which the cord is adapted to be dispensed.

20 Claims, 5 Drawing Sheets

POWER ADAPTER

This application claims priority under 35 U.S.C. §119 to U.S. Provisional Application No. 60/161,077 entitled Laptop Computer Enhancements and filed on Oct. 25, 1999, the entire content of which is hereby incorporated by reference.

This application is a continuation of International Application No. PCT/US00/41543 filed on Oct. 25, 2000.

FIELD OF THE INVENTION

The present invention relates to power adapters for electrical devices and, more particularly, to power adapters having retractable cords.

BACKGROUND AND SUMMARY

Various electrical devices such as laptop and notebook computers are provided with power adapters to recharge the batteries provided with the computers and to operate computers. Conventional power adapters are typically provided with a pair of cords extending from a structure in which electrical circuitry for converting power input through one of the cords to a desired power level to be output through the other one of the cords to an electrical device. This type of conventional power adapter is inconvenient in that the structure containing the electrical circuitry can be bothersome, such as by continuously falling off of a table top or by being an obstruction. It is desirable to provide a power adapter that is able to avoid such inconveniences.

The cords provided with conventional power adapters can also be bothersome, particularly when they are substantially longer than is necessary for a particular application. The electrical power cord can become tangled either with itself or with other cords. When the power adapter is not in use, it is often necessary to coil up the cord and bind it to store the power adapter in a small space and to avoid having the cords become tangled. It is desirable to provide a power adapter that is able to reduce the tendency of cords to tangle and that is easy to store.

According to one aspect of the present invention, a power adapter for an electrical device includes a male electrical plug, an electrical connection, and electrical circuitry connected to the plug for converting power input to the power adapter through the plug to power suitable for an electrical device to be electrically connected to the electrical connection. The power adapter further includes a first housing member for containing the plug, the electrical connection, and the electrical circuitry, and a second housing member attachable and detachable to the first housing member and including a cord including an electrical power cord attachable at a first end to the electrical connection and at a second end to the electrical device, and a reel on which the cord is adapted to be wound and from which the cord is adapted to be dispensed.

According to another aspect of the present invention, a power adapter for an electrical device includes a male electrical plug, an electrical connection, electrical circuitry connected to the plug for converting power input to the power adapter through the plug to power suitable for an electrical device to be electrically connected to the electrical connection. The power adapter further includes a housing member for containing the plug, the electrical connection, and the electrical circuitry and including a cord including an electrical power cord attached at a first end to the electrical connection and attachable at a second end to the electrical device, and a reel on which the cord is adapted to be wound and from which the cord is adapted to be dispensed.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
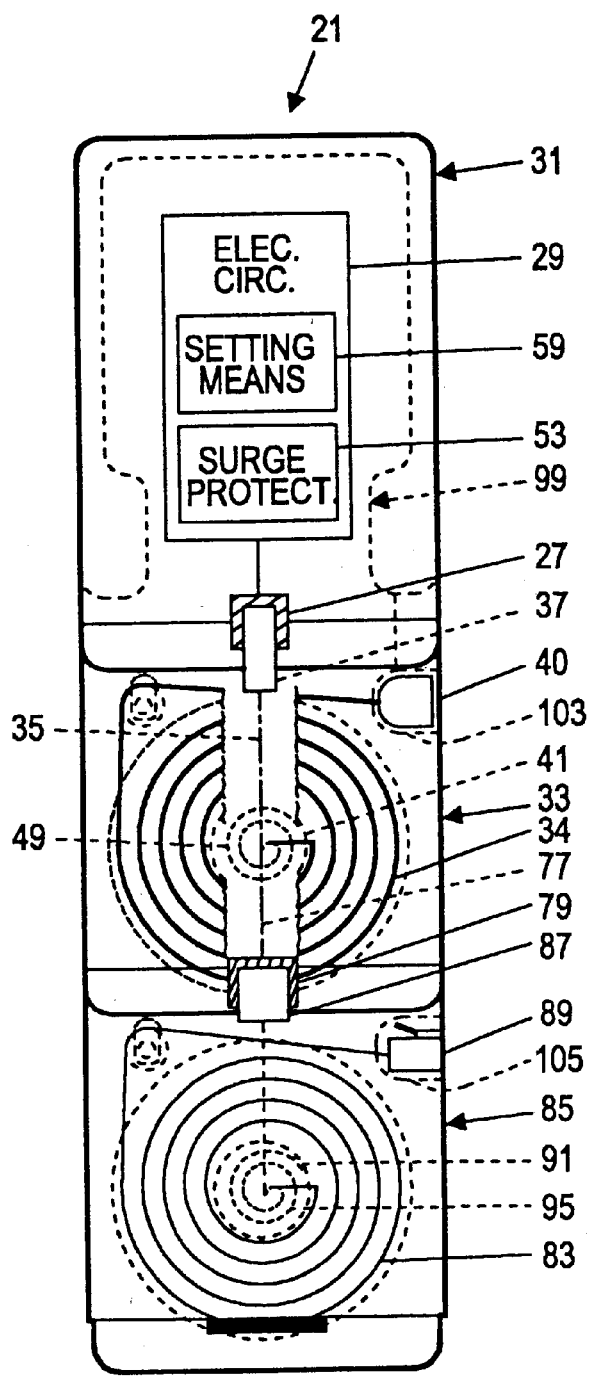
FIGS. 1A and 1B are schematic front and side cross-sectional views of a power adapter according to an embodiment of the present invention.
Figure 1B:
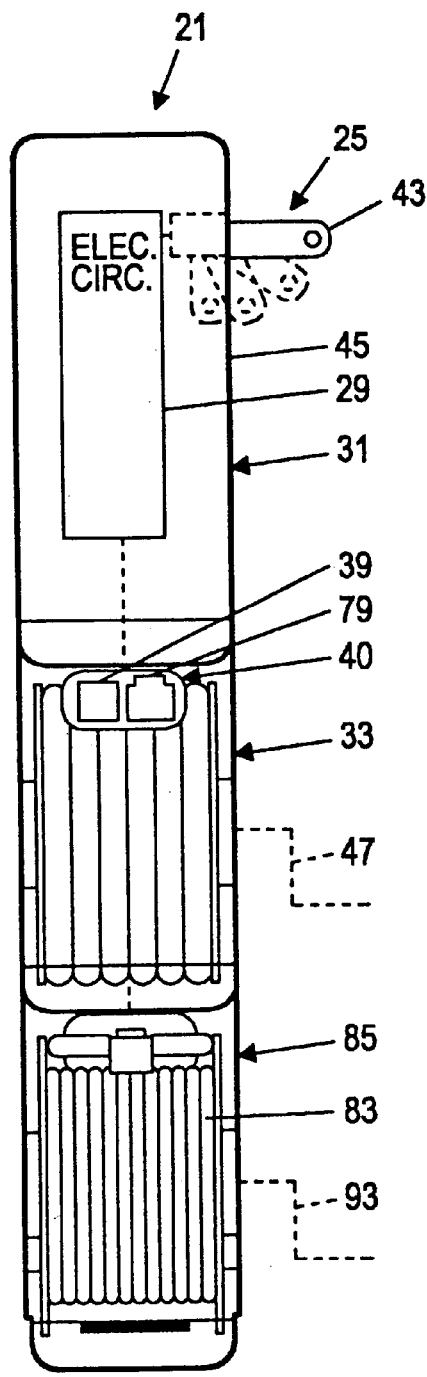
Figure 2:
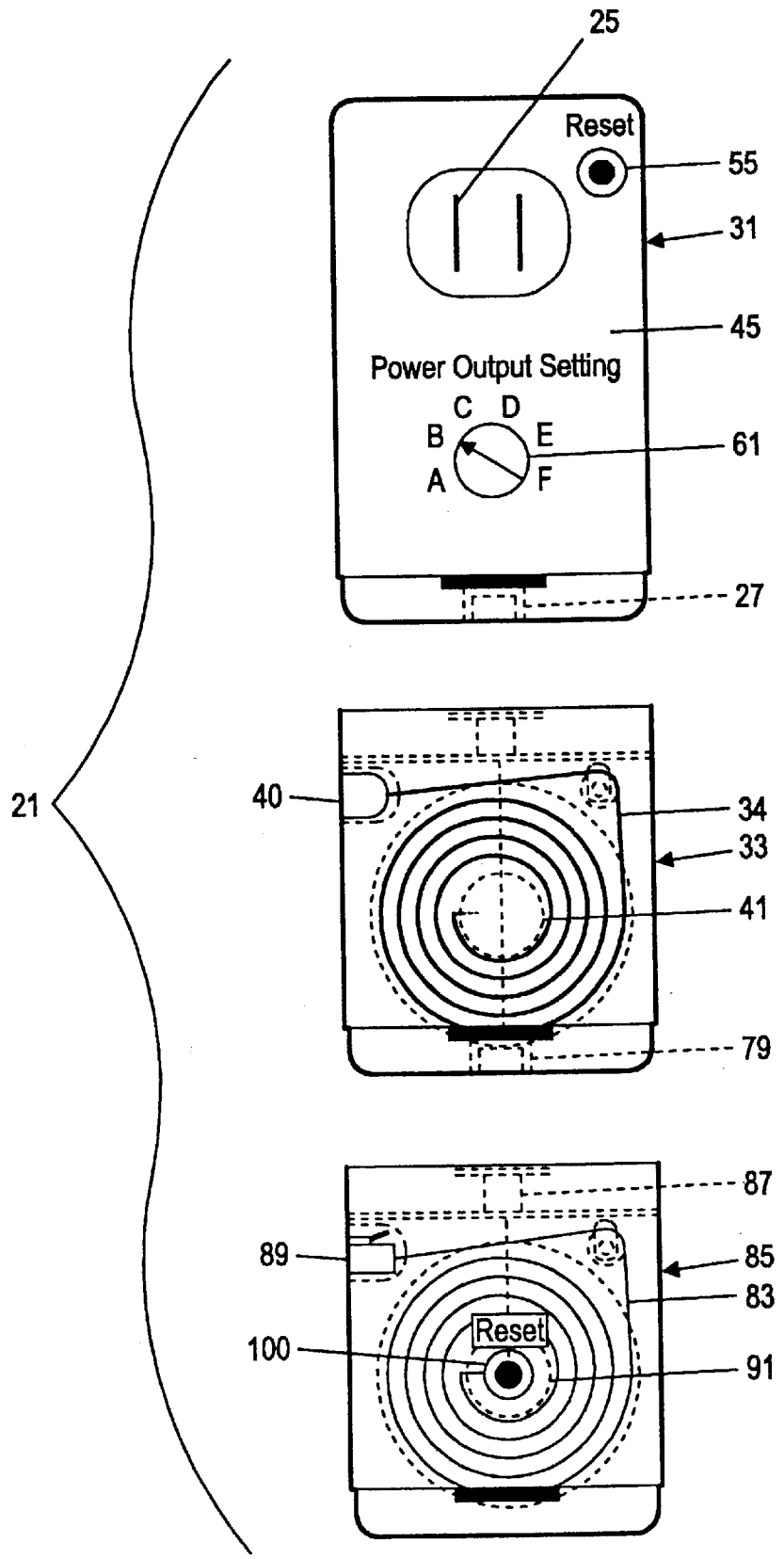
FIG. 2 is a schematic, exploded, partially cross-sectional, rear view of the power adapter shown in FIGS. 1A and 1B.

A power adapter 21 for an electrical device according to a first embodiment of the present invention is shown in FIGS. 1A, 1B, and 2. The power adapter 21 includes a male electrical plug 25 (not seen in FIG. 1A), an electrical connection 27, preferably in the form of a male or female electrical plug connection, and electrical circuitry 29 connected to the plug for converting power (usually AC power) input to the power adapter through the plug to a power level (usually DC power) suitable for powering an electrical device such as a laptop or notebook computer that is electrically connected to the electrical connection.

The power adapter 21 further includes a first housing member 31 for containing the plug 25, the electrical connection 27, and the electrical circuitry 29. The first housing member is preferably a plastic member of sufficient strength to protect the plug 25, the electrical connection 27, and the electrical circuitry 29 during ordinary use. The first housing member 31 may, if desired or necessary, be made of a material that provides electrical shielding, as may any other housing members (e.g., 33, 85) associated with the power adapter.

The power adapter 21 further includes a second housing member 33 attachable and detachable to the first housing member 31 and including a cord 34 including an electrical power cord 35 (FIG. 6) that is attachable at a first end 37 to the electrical connection 27 and at a second end 39 to the electrical device. The second housing member 33 also includes a reel 41 on which the cord 34 is adapted to be wound and from which the cord is adapted to be dispensed. As seen, for example, in FIG. 2, the first housing member 31 and the second housing member 33 are preferably attachable and detachable through a male-female connection at ends of the first and second housing members. The first and second housing members 31 and 33 may also include other arrangements such as detent and recess arrangements for more tightly securing the male and female portions of the housing members together. A third housing member 85, if provided, which is discussed further below, may be attachable and detachable to the second housing member in the manner in which the first and second housing members are secured together.

The male electrical plug 25 is preferably pivotable from a first position (shown in phantom in FIG. 1B) in which one or more prongs 43 thereof are substantially flush with or recessed behind an exterior surface 45 of the first housing member 31 to a second position in which the one or more prongs are disposed at a non-zero angle, preferably 90°, relative to the exterior surface of the first housing member. By providing the pivoting plug 25, damage to the plug while the power adapter 21 is not in use can be minimized, and the space necessary for carrying the power adapter can be minimized. U.S. Pat. No. 5,780,993 and U.S. Pat. No. 4,625,259, the disclosures of which are incorporated by reference, disclose pivotable male electrical plugs of types suitable for use in connection with the present invention.

The reel 41 may include a handle or crank 47 (shown in phantom in FIG. 1B) or other means for manually rewinding the cord 34 onto the reel. U.S. Pat. No. 5,923,147, which is incorporated by reference, shows a cord reel including grooves for manually rewinding the cord onto the reel, and is one example of a manual cord reel that is suitable for use in connection with the present invention. As seen in FIG. 1A, the reel 41 preferably includes a spring-loaded drive 47 (shown in phantom) for automatically rewinding the cord 34 onto the reel. Spring-loaded drives for rewinding cords on reels are common in various corded devices and appliances, such as is seen from U.S. Pat. No. 6,082,656, which is incorporated by reference, and are similarly suited for use in connection with the present invention. At least one of the reel 41 and the spring-loaded drive 49 preferably includes a suitable lock, such as a ratchet, for preventing the drive 49 from automatically rewinding the cord 34 onto the reel until a user releases the lock.

The electrical circuitry 29 of the type with which the present invention is concerned is well known and, except to the extent otherwise noted herein, does not, itself, comprise the present invention. U.S. Pat. No. 4,625,259, which is incorporated be reference, explains that such circuitry is well known, and U.S. Pat. No. 4,939,623, U.S. Pat. No. 5,734, 254, and U.S. Pat. No. 5,744,934, all of which are incorporated by reference, provide illustrative examples of such electrical circuitry. The electrical circuitry 29 preferably includes resetable or non-resetable surge protection means 53 (FIG. 1B). Surge protection means of the type with which the present invention is concerned are well known to users of computers. The surge protection means 53 preferably includes a reset button 55 (FIG. 2) extending through a wall of the first housing member 31 and accessible to a user from the outside of the first housing member. The reset button 55 is preferably located on the front face of the housing 31, on the side opposite the plug 25, but may, as shown in FIG. 2, be disposed on the rear face of the housing, or any other suitable face of the power adapter.

Figure 3:
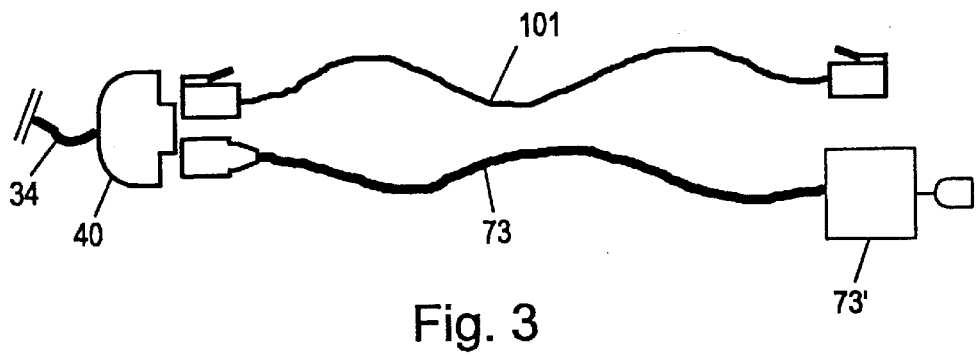
FIG. 3 is a schematic view of cords of a power adapter according to an embodiment of the present invention.
Figures 4A, 4B:
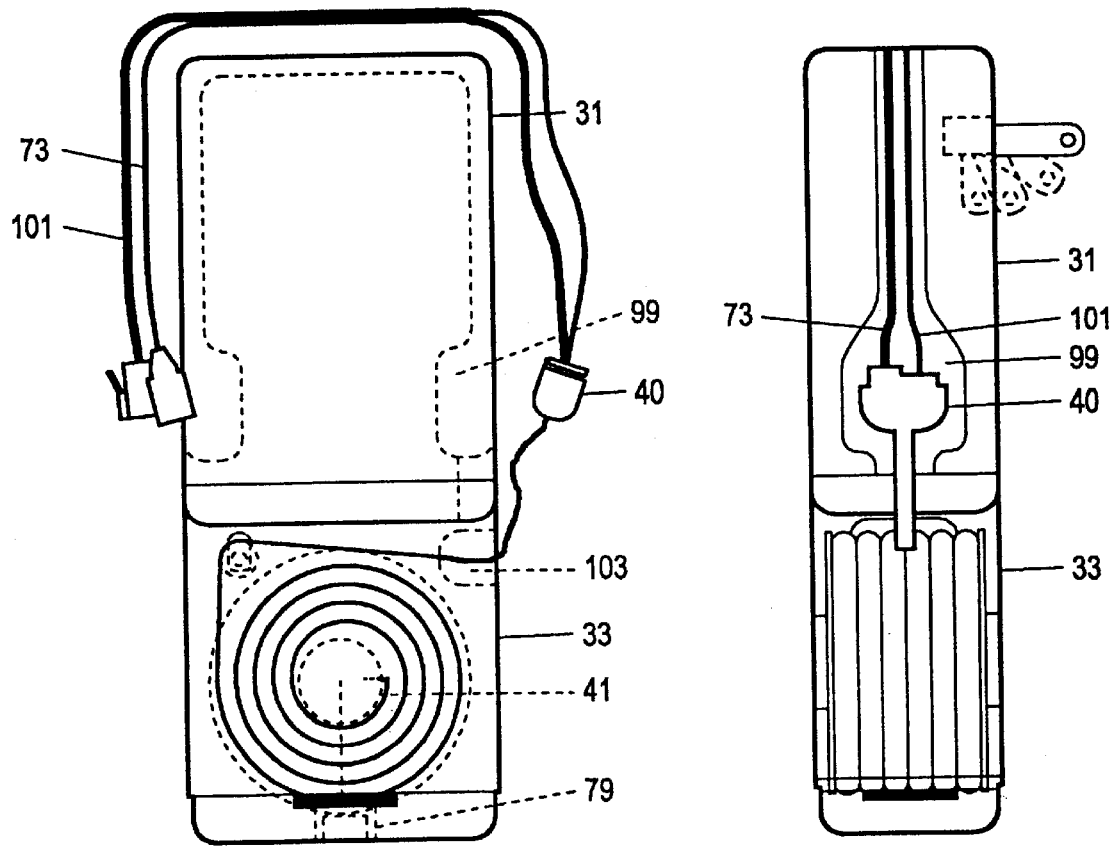
FIGS. 4A and 4B are partially cross-sectional, schematic, front and side views, respectively, of a power adapter according to an embodiment of the present invention.

The electrical circuitry 29 preferably also includes conventional means 59 for setting the electrical circuitry to provide different power output levels. The setting means 59 preferably includes a rotatable knob 61 (FIG. 2) that is rotatable to different settings to provide a desired power output, the knob extending through the wall of the first housing member 31 and being accessible to a user from the oustide surface 45 of the first housing member. The setting means 59 adjusts the output power to approximately a desired output level for a particular electrical device and a further power cord 73 (FIGS. 3 and 4A–4B) preferably includes means 73' for further adjusting or fine tuning the output power level to meet the requirements of the particular electronic device in a known manner.

Figure 5:
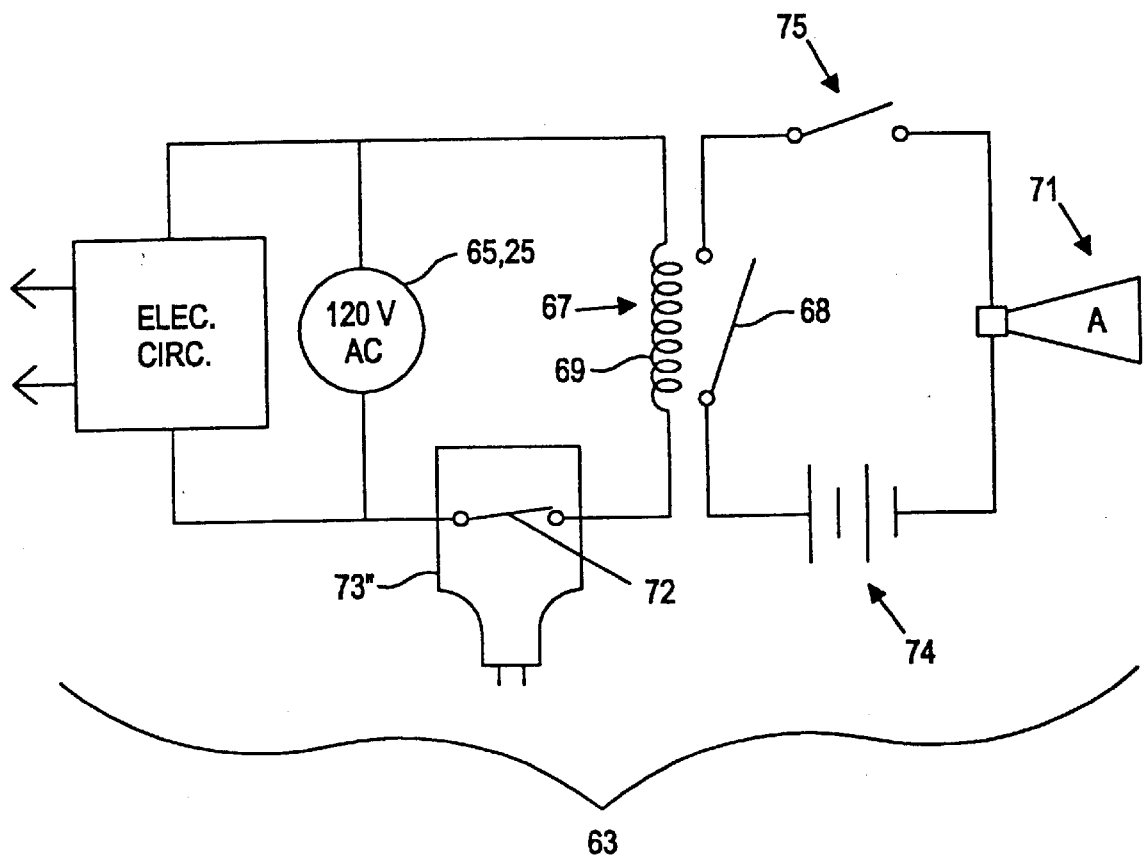
FIG. 5 is a circuit diagram showing an alarm circuit of the electrical circuitry of a power adapter according to an embodiment of the present invention.

A sensor 63 is preferably adapted to sense when the plug 25 of the power adapter 21 is properly plugged into a power supply socket 65, an embodiment of which is seen in FIG. 5. The sensor 63 may be an electrical sensor that senses presence or absence of current in the electrical circuitry 29. Many different forms of sensors can be adapted to function as the sensor 63 and FIG. 5 is merely one example of a suitable sensor 63. The sensor 63 may include a relay 67 in which a switch 68 is open when the plug 25 is properly plugged into a power supply socket 65 such that a current flows through the coil 69 of the relay and in which the switch 68 of the relay is closed when the plug 25 is not properly plugged into the power supply socket 65 such that no current flows through the coil 69. The power cord 35 and/or a plug 73" of a cord 73 that connects the power cord to a computer or other electrical device can also be configured to detect unauthorized removal of the adapter 21 from the computer, such as by providing a switch 72 in a plug 73" of the cord 73 that closes when the plug is properly received in a receptacle in the electrical device and opens when the plug is removed. The switch 72 can be in series with the coil of the relay 67 so that any interruption in the power supply through the plug 25 will cause the switch 68 to close. When the switch 68 closes, it completes a circuit including a battery operated alarm 71 and a battery 74 that powers the alarm. To avoid having the alarm 71 go off whenever an authorized user desires to unplug the adapter 21 from the power supply socket 65 or the electrical device, a key switch 75 or similar device can be provided. Suitable circuitry (not shown) can also be provided for recharging the battery 74 when the power adapter 21 is plugged into a power supply socket.

Figure 6:
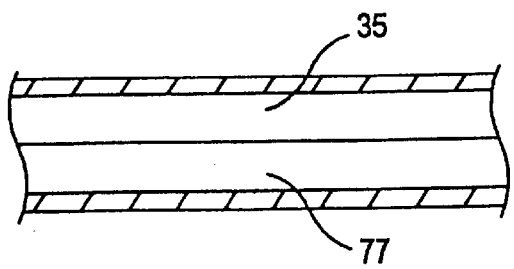
FIG. 6 is a partially cross-sectional schematic view of an embodiment of a cord for use with an embodiment of the power adapter according to an embodiment of the present invention.

As seen in FIG. 6, the cord 34 preferably includes a telephone cord 77 connected to a female telephone connection 79 at one end. As seen in FIGS. 1A and 2, the female telephone connection 79 is preferably accessible at a bottom end of the second housing member 33. The female telephone connection 79 can be connected to a conventional telephone jack by a further telephone cord (not shown) having two male connections. Preferably, the female telephone connection 79 is connected to a conventional telephone jack by a second telephone cord 83 that is part of a third housing member 85 attachable and detachable to the second housing member 33. The third housing member 85 preferably includes the second telephone cord 83, which preferably has a first male telephone connection 87 at a first end thereof and a second male telephone connection 89 at a second end thereof. The first male telephone connection 87 preferably automatically connects with the female telephone connection 79 when the third housing member 85 is attached to the second housing member 33. The third housing member 85 preferably includes a second reel 91 on which the second telephone cord 83 is adapted to be wound and from which the second telephone cord is adapted to be dispensed. The second reel 91 may be a manual reel with a handle or crank 93 or may have a drive 95, such as a spring-loaded drive, like the reel 41, and is preferably provided with a suitable lock. The third housing member 85 is preferably also provided with a resetable or non-resetable surge protection means 100 to protect against power surges through telephone lines. The surge protection means 100 may include a reset button as illustrated. The reset button is preferably located on the front face of the third housing member 85 but may, if desired or necessary, be disposed on the rear face of the third housing member as illustrated in FIG. 2, or any other suitable face of the power adapter.

The first housing member 31 preferably includes a cord cradle 99 in the form of a recess around the periphery of the first housing member and in which the end 40 of the cord 34 at which the second end 39 of the power cord 35 is provided and, if connected, the further power cord 73 and a further telephone cord 101 are received when the power cord is wound onto the reel 41. The second housing member 33 is preferably also provided with a recess 103 in which the second end 40 of the cord 34 is adapted to be received, and the third housing member 85 is preferably provided with a recess 105 in which the second male telephone connection 89 is adapted to be received.

The power adapter 21 has been illustrated herein in connection with an embodiment wherein the male plug 25 has a pair of prongs 41 of the type conventionally used with U.S. power supplies. It will be appreciated that other types of male plugs, such as those conventionally used with European or other power supplies could be provided.

Figure 7A:
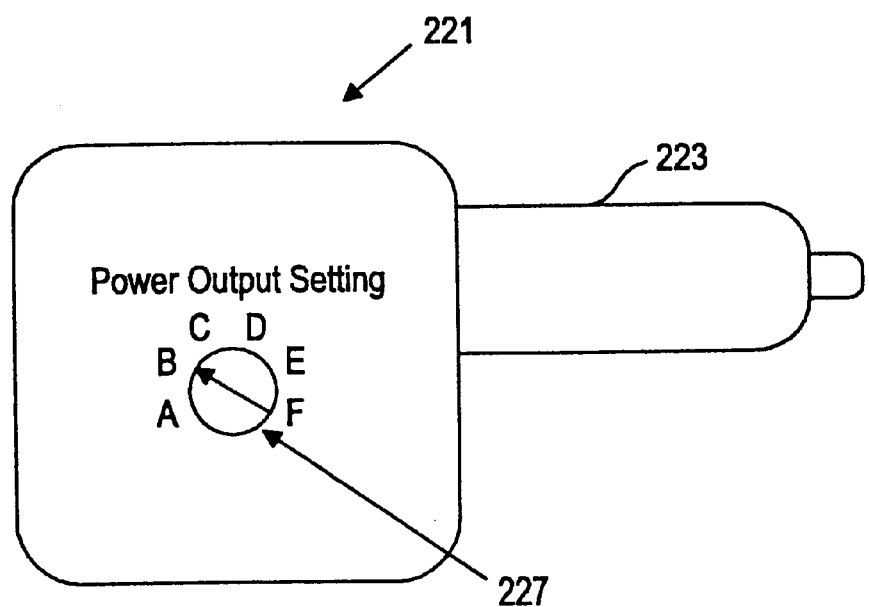
FIG. 7A is a schematic front view and FIG. 7B is a schematic, rear, partially cross-sectional view of a power adapter according to another embodiment of the present invention.
Figure 7B:
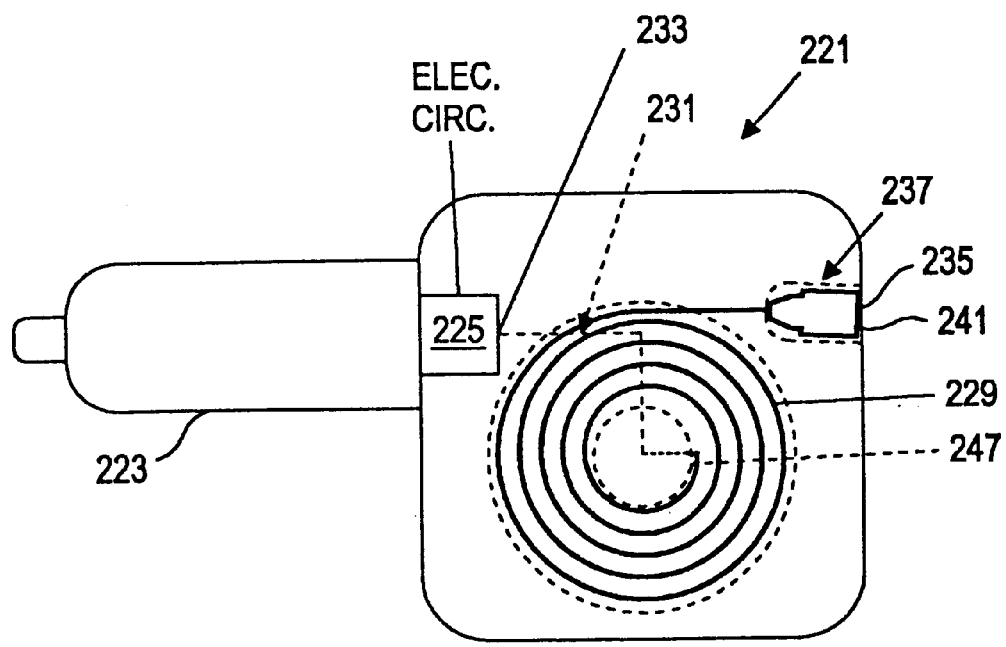

FIGS. 7A and 7B show a power adapter 221 according to another embodiment of the present invention. The power adapter 221 is intended for use in converting power supplied from a conventional automobile or aircraft cigarette lighter to a desired level for an electrical device such as a laptop or notebook computer. The power adapter 221 has a conventional male plug 223 for being received in the female socket of a cigarette lighter. Electrical circuitry 225 is preferably provided for converting power input through the male plug 223 to desired power characteristics. The electrical circuitry 225 preferably includes setting means including a knob 227 that is accessible on an outer surface of the power adapter 221 for adjusting an output power level to at least approximately a desired output power level in the manner of the setting means 59 discussed above.

The power adapter 221 is preferably also provided with a cord 229 including an electrical power cord 231 that is connected, at a first end 233, to the electrical circuitry 225 and has a female connection 235 at a second end of the power cord 231 (also the second end 237 of the cord 229) for connection to an electrical device. The cord 229 is preferably wound on and dispensible from a reel 247. The reel 247 can be manually operated to rewind the cord after it is dispensed in the manner discussed above, or can include an automatic rewinding arrangement, such as a spring operated arrangement in the manner discussed above.

While this invention has been illustrated and described in accordance with a preferred embodiment, it is recognized that variations and changes may be made therein without departing from the invention as set forth in the claims.

What is claimed is:

1. A power adapter for an electrical device, comprising:
   a male electrical plug;
   an electrical connection;
   electrical circuitry connected to the plug for converting power input to the power adapter through the plug to power suitable for an electrical device to be electrically connected to the electrical connection;
   a first housing member for containing the plug, the electrical connection, and the electrical circuitry;
   a second housing member attachable and detachable to the first housing member and including a cord including an electrical power cord attachable at a first end to the electrical connection and at a second end to the electrical device, and a reel on which the cord is adapted to be wound and from which the cord is adapted to be dispensed.

2. The power adapter as set forth in claim 1, wherein the male electrical plug is pivotable from a first position in which one or more prongs thereof are substantially flush with an exterior surface of the first housing member to a second position in which the one or more prongs are disposed at a non-zero angle relative to the exterior surface of the first housing member.

3. The power adapter as set forth in claim 1, wherein the reel includes a handle for manually rewinding the cord onto the reel.

4. The power adapter as set forth in claim 1, wherein the reel includes a spring-loaded drive for automatically rewinding the cord onto the reel.

5. The power adapter as set forth in claim 1, wherein the electrical circuitry includes surge protection means.

6. The power adapter as set forth in claim 5, wherein the surge protection means includes a reset button extending through a wall of the first housing member.

7. The power adapter as set forth in claim 1, wherein the electrical circuitry includes means for setting the electrical circuitry to accommodate different output power levels.

8. The power adapter as set forth in claim 7, wherein the setting means includes a rotatable knob extending through a wall of the first housing member.

9. The power adapter as set forth in claim 1, further comprising a sensor adapted to sense when at least one of the plug of the power adapter is not properly plugged into a power supply socket and the second end of the power cord is not properly plugged into the electrical device.

10. The power adapter as set forth in claim 9, wherein the sensor is an electrical sensor that senses presence or absence of current.

11. The power adapter as set forth in claim 9, wherein the sensor is adapted to sense either when the plug of the power adapter is not properly plugged into a power supply socket and when the second end of the power cord is not properly plugged into the electrical device.

12. The power adapter as set forth in claim 9, further comprising an alarm associated with the sensor, the alarm being activated when the at least one of the plug of the power adapter is not properly plugged into a power supply socket and the second end of the power cord is not properly plugged into the electrical device.

13. The power adapter as set forth in claim 1, wherein the cord includes a telephone cord connected to a female telephone connection at at least one end.

14. The power adapter as set forth in claim 13, wherein the second housing member has an opening formed therein through which the female telephone connection is accessible.

15. The power adapter as set forth in claim 14, further comprising a third housing member attachable and detachable to the second housing member, the third housing member including a second telephone cord having a first male telephone connection at a first end thereof and a second male telephone connection at a second end thereof, the first male telephone connection automatically connecting with the female telephone connection when the third housing member is attached to the second housing member, and a second reel on which the second telephone cord is adapted to be wound and from which the second telephone cord is adapted to be dispensed.

16. The power adapter as set forth in claim 15, wherein the second reel includes a handle for manually rewinding the second telephone cord onto the reel.

17. The power adapter as set forth in claim 15, wherein the second reel includes a spring-loaded drive for automatically rewinding the second telephone cord onto the second reel.

18. The power adapter as set forth in claim 1, wherein the first housing includes a cord cradle.

19. A power adapter for an electrical device, comprising:

a male electrical plug;

an electrical connection;

electrical circuitry connected to the plug for converting power input to the power adapter through the plug to power suitable for an electrical device to be electrically connected to the electrical connection;

a housing member for containing the plug, the electrical connection, and the electrical circuitry and including a cord including an electrical power cord attached at a first end to the electrical connection and attachable at a second end to the electrical device, and a reel on which the cord is adapted to be wound and from which the cord is adapted to be dispensed.

20. The power adapter as set forth in claim 19, wherein the cord includes a telephone cord connected to a female telephone connection at at least one end.

* * * * *